United States Patent
Cherukumudi et al.

(10) Patent No.: US 7,424,608 B1
(45) Date of Patent: Sep. 9, 2008

(54) MECHANISM FOR LAYERED AUTHENTICATION

(75) Inventors: Vijaykumar Cherukumudi, Overland Park, KS (US); David K. Fultz, Raymore, MO (US); Shrikant D. Jannu, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 680 days.

(21) Appl. No.: 10/943,083

(22) Filed: Sep. 16, 2004

(51) Int. Cl.
*H04L 9/00* (2006.01)

(52) U.S. Cl. .................. 713/156; 713/153; 713/176; 726/8; 726/10

(58) Field of Classification Search .............. 713/153, 713/156, 176; 726/8, 10
See application file for complete search history.

(56) References Cited

U.S. PATENT DOCUMENTS

| | | | |
|---|---|---|---|
| 6,611,869 B1 * | 8/2003 | Eschelbeck et al. | 709/228 |
| 6,807,577 B1 * | 10/2004 | Gillespie et al. | 709/227 |
| 7,219,134 B2 | 5/2007 | Takeshima et al. | |
| 2005/0044197 A1 * | 2/2005 | Lai | 709/223 |

OTHER PUBLICATIONS

Cherukumudi, Vijaykumar, et al., "Web Services Security Architecture," U.S. Appl. No. 10/842,400, filed May 10, 2004.

* cited by examiner

*Primary Examiner*—Emmanuel L Moise
*Assistant Examiner*—Paul Callahan

(57) ABSTRACT

A system for secure communication over a computer network. The system includes a web server, a component, and a service gateway. The web server is operable to receive a message from a customer application via a transport layer and validate a digital certificate associated with the message. The component, which may be a software component, receives the digital certificate from the web server at the transport layer and provides the digital certificate at an application layer. The service gateway receives the digital certificate at the application layer and identifies the customer application associated with the digital certificate. The service gateway promotes validation of the digital certificate and wherein the digital certificate is valid, the service gateway promotes communication of the message from the customer application to a supplier application.

17 Claims, 3 Drawing Sheets

MECHANISM FOR LAYERED AUTHENTICATION

CROSS-REFERENCE TO RELATED APPLICATIONS

This application addresses subject matter related to U.S. patent application Ser. No. 10/842,400, filed May 10, 2004 and entitled "Web Services Security Architecture", which is incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to secure communication between computing systems. More particularly, embodiments of the present invention allow messages that are not in a SOAP format to be sent securely between two computing systems.

BACKGROUND OF THE INVENTION

Simple Object Access Protocol (SOAP) is a protocol for sending messages between computer systems on a network. Messages are placed in an Extensible Markup Language (XML) format and transmitted via the Hypertext Transfer Protocol (http). Since XML and http are commonly available on many computing systems, SOAP offers a convenient means for communication, even among computers operating under different platforms.

A typical SOAP message might consist of a SOAP envelope that is made up of a SOAP header and a SOAP body. The body typically contains the message itself while the header might contain metadata about the message, such as security information. When secure communication is desired between a client and a server on a network, the necessary identifying information, such as a digital certificate, can be included in the SOAP message header.

Some enterprises wishing to communicate securely over a network may be unable or unwilling to use the SOAP messaging format. In that case, another protocol for secure communication is desirable.

SUMMARY OF THE INVENTION

In one embodiment, a system for secure communication over a computer network is provided. The system includes a web server, a component, and a service gateway. The web server is operable to receive a message from a customer application via a transport layer and validate a digital certificate associated with the message. The component, which may be a software component, receives the digital certificate from the web server at the transport layer and provides the digital certificate at an application layer. The service gateway receives the digital certificate at the application layer and identifies the customer application associated with the digital certificate. The service gateway promotes validation of the digital certificate and wherein the digital certificate is valid, the service gateway promotes communication of the message from the customer application to a supplier application.

An alternative embodiment is for a method for securely sending a message from a customer application to a supplier application. The method includes obtaining a digital certificate from a certificate authority by the customer application. The method includes configuring the digital certificate with identifying information by the customer application, and sending a message and the digital certificate by the customer application to a web server. The method provides for sending identifying information by the web server to the customer application, and authenticating the customer application by the web server at the transport layer using the digital certificate. The method includes authenticating the web server by the customer application, and communicating at the application layer between the web server and the service gateway related to the digital certificate. The method also includes identifying the customer application by the service gateway, and checking a certificate revocation list to determine if the digital certificate has been revoked. Where the digital certificate has not been revoked, the service gateway promotes communication by the customer application of the message to the supplier application.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

DETAILED DESCRIPTION OF THE PREFERRED EMBODIMENTS

It should be understood at the outset that although an exemplary implementation of one embodiment is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

In various embodiments, systems and methods are provided that allow two enterprises to communicate securely over a computer network. When a first enterprise is sending messages or making requests to a second enterprise, the first enterprise can be referred to as a customer and the second enterprise can be referred to as a supplier. In an embodiment, when a customer application sends a message to a supplier application, a digital certificate is exchanged between the customer and supplier so that each can authenticate the identity of the other. This exchange typically takes place at the OSI transport layer and the certificate remains at the transport layer.

In an embodiment, the supplier may also need to authenticate the customer application at the OSI application layer. The certificate that the customer provided to the supplier at the transport layer typically contains information that can authenticate the customer at the application layer. However, the certificate is typically unable to perform authentication at the application layer while it is present at the transport layer. In an embodiment, a component maintained by the supplier at the application layer retrieves the certificate from the transport layer and moves the certificate to the application layer. The certificate can then be used to authenticate the customer application at the application layer.

If the customer is authenticated at both the transport and application layers, the customer application is allowed access to the supplier application. This can provide a level of security similar to that of SOAP when a customer or supplier is unwilling or unable to use SOAP, which may be the case when using SOAP is too costly or time-consuming, when the customer does not have sufficient expertise in the use of SOAP, or in various other situations.

Figure 1:
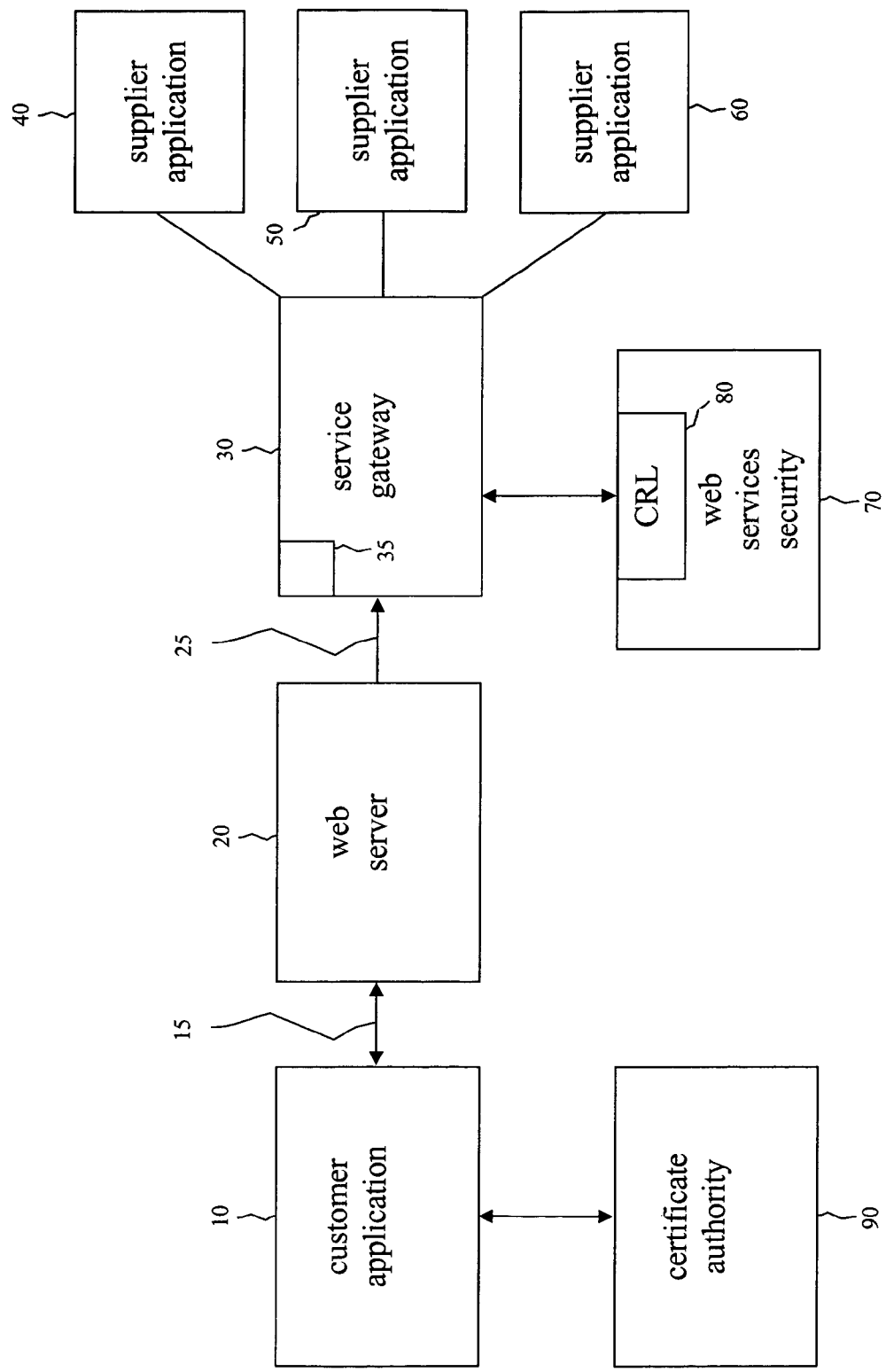
FIG. 1 is a block diagram of an embodiment of a mechanism for layered authentication.

An embodiment of a system allowing such communication between a customer and a supplier is shown in FIG. 1. A customer application 10 wishes to communicate with a supplier application 40, 50, or 60. While three supplier applications are shown, other numbers could be present. To reach a supplier application 40, 50, or 60, a message sent by the customer application 10 first passes through a web server 20 and a service gateway 30, both maintained by the supplier. The web server 20 can be a commercially available product such as iPlanet, Apache, or a similar web server. The service gateway 30 can be a product created by the supplier to manage access to its internal applications 40, 50, and 60. The service gateway 30 intercepts incoming messages and determines whether or not to allow a customer application 10 to have access to a supplier application 40, 50, or 60.

In an embodiment, communication among the components in FIG. 1 follows the Secure Sockets Layer protocol. Secure Sockets Layer (SSL) and its successor Transport Layer Security (TLS) are protocols for managing the secure transmission of messages across the internet or other networks. SSL communication can be either one-way or two-way. In one-way SSL, a client wants to be sure it can trust a server before the client sends information to the server, so the client demands a digital certificate from the server. The server must send the certificate to the client before a session between the client and the server can be established. In two-way SSL, the server sends the certificate to the client, but before it establishes a session with the client, it demands a certificate from the client. A session can be established when the server receives the certificate from the client.

With SOAP messages, the necessary identifying information for the secure transmission of a message from the client to the server is contained in the message header. Validation of the server back to the client is done through one-way SSL. According to an embodiment of the present disclosure, when the SOAP format is not used, two-way SSL may be used to accomplish the authentication of a customer application and a web server. In FIG. 1, the communication path 15 between the customer application 10 and the web server 20 uses two-way SSL. That is, the customer application 10 and the web server 20 exchange digital certificates, via path 15, to verify each other's identity. The web server 20 and the customer application 10 use separate digital certificates which may be obtained from the same or different certificate authorities.

When a customer application 10 wants to access a supplier application 40, 50, or 60, the customer application 10 goes to a certificate authority 90 managed by the supplier and obtains a digital certificate. In other embodiments, the certificate authority may be separately managed and proved outside the supplier's network. Authentication of the web server 20 and/or customer application 10 for purposes of obtaining digital certificates from the certificate authority is known in the art. In an embodiment, the certificate complies with the X.509 standard for digital certificates.

The customer application 10 configures the certificate on its end with identifying information and sends the certificate to the web server 20. The web server 20 sends its identifying information to the customer application 10. If the customer application 10 and the web server 20 authenticate each other, a session can be established between the customer application 10 and the web server 20. A message can then be sent from the customer application 10 to the web server 20.

In an embodiment, communication among the components in FIG. 1 also follows the standard, seven-layer Open Systems Interconnection (OSI) model. Communication between the customer application 10 and the web server 20 and between the web server 20 and the service gateway 30 occurs at the OSI transport layer. The service gateway 30 is at the OSI application layer.

When the customer application 10 and the web server 20 authenticate each other at the transport layer using a digital certificate and two-way SSL, the certificate remains at the transport layer on the web server 20. In an embodiment, additional authentication may need to be done at the application layer. However, a certificate that is provided at the transport layer may not be accessible for authentication by applications, such as the service gateway 30, at the application layer. Therefore, the supplier typically needs to move the certificate from the transport layer to the application layer.

In an embodiment, the certificate is passed from the web server 20, which is at the transport layer, to the service gateway 30, which is at the application layer, through the use of a component, which in a preferred embodiment may be a software routine that can be referred to as a client cert proxy property 35. The client cert proxy property 35, which resides in the service gateway 30, pulls the certificate from the web server 20 to the service gateway 30, thus moving the certificate from the transport layer to the application layer. The communication path 25 between the web server 20 and the service gateway 30 uses one-way SSL.

The client cert proxy property code can be a standard technique for retrieving a certificate based on the J2EE specification or similar coding protocols. The following Java code is an example of a software routine that can act as the client cert proxy property 35. This code is provided as an example only and it should be understood that other coding techniques, other syntax, and other languages could be used.

```
try {
  out.print("javax.servlet.request.X509Certificate:");
  java.security.cert.X509Certificate certs [ ]=
Oava.security.cert.X509Certificate [ ])
  req.getAttribute("javax.servlet.request.X509Certificate");
  if (certs ==null || certs.length ==0) {
  out.println("<none>– not using SSL or client certificate
"
+"not required for this connection.");
  }
  else {
  out.println(certs.length+"certificates");
  print(out, "Subject Name", certs[0].getSubjectDN( ).get-
     Name( ));
```

```
print(out, "Issuer Name", certs[0].getIssuerDN( ).get-
    Name( ));
print(out, "Certificate Chain Length", certs.length);
for (int i=0; i<certs.length; i++) {
    print(out, "Certificate["+i+"] Subject",
certs[i].getSubjectDN( ).getName( ));
    print(out, "Certificate["+i+"] Issuer",
certs[i].getIssuerDN( ).getName( ));
}
```

At the transport layer, a certificate can authenticate a customer, but it cannot identify the client. That is, a supplier can confirm that the certificate is valid but there is no way to determine, at the transport layer, to whom the certificate belongs. Therefore, the service gateway 30 uses the certificate it retrieves from the transport layer to perform identification of the customer application at the application layer.

When the service gateway 30, by means of the client cert proxy property 35, obtains a certificate from the web server 20, it validates the certificate by consulting with a web services security component 70. The web services security component 70 can be an enterprise-wide system created by the supplier that is capable of validating certificates and determining the identity of an entity to which a certificate was issued. A suitable web services security component 70 is described in U.S. patent application Ser. No. 10/842,400, filed May 10, 2004 and entitled "Web Services Security Architecture", which is incorporated herein by reference for all purposes.

A certificate revocation list (CRL) 80 within the web services security component 70 contains a list of customer certificates that have been revoked. If a certificate is not on the CRL 80, the web services security component 70 considers the certificate valid. When the service gateway 30 is informed by the web services security component 70 of the validity of a certificate and of the identity of the entity to which the certificate was issued, the service gateway 30 allows a client application 10 to invoke an appropriate downstream application 40, 50, or 60.

Figure 2:
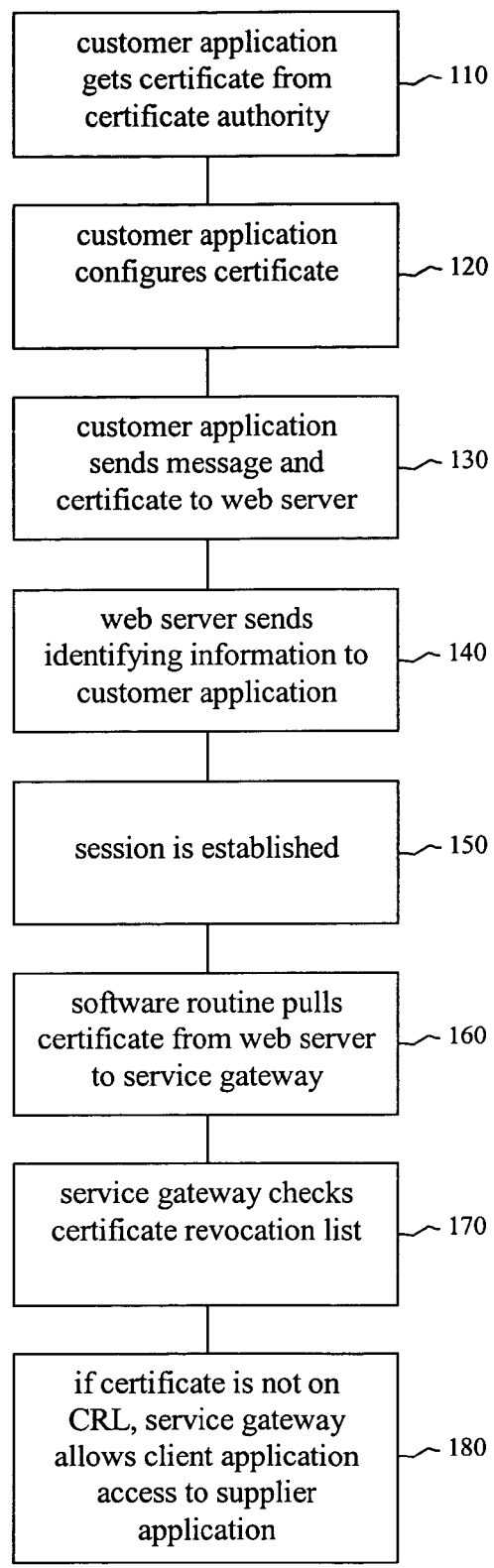
FIG. 2 is a flowchart of a method for secure communication using layered authentication.

FIG. 2 illustrates an embodiment of a method for securely transmitting messages between a customer application and a supplier application. In box 110, a customer application wishing to communicate with a supplier application obtains a certificate from a certificate authority maintained by the supplier. In box 120, the customer application configures the certificate with identifying information. The customer application sends the certificate and a message to a web server in box 130. In box 140, the web server sends its identifying information to the customer application.

If the customer application and the web server validate each other, a session between the customer application and the web server is established in box 150. At this point, the certificate resides in the web server, which is at the OSI transport layer. A need may exist for the supplier to authenticate the customer at the OSI application layer but a certificate at the transport layer typically cannot perform authentication at the application layer. Therefore, the supplier moves the certificate from the transport layer to the application layer. In box 160, a software routine residing in a service gateway maintained by the supplier pulls the certificate from the web server, which is at the transport layer, to the service gateway, which is at the application layer.

With the certificate at the application layer, the service gateway can use the certificate to authenticate the customer at the application layer. In box 170, the service gateway checks a certificate revocation list maintained by the supplier to determine if the certificate has been revoked. In box 180, if the certificate is not on the certificate revocation list, the service gateway considers the customer authentic and allows the customer application to have access to the supplier application.

Figure 3:
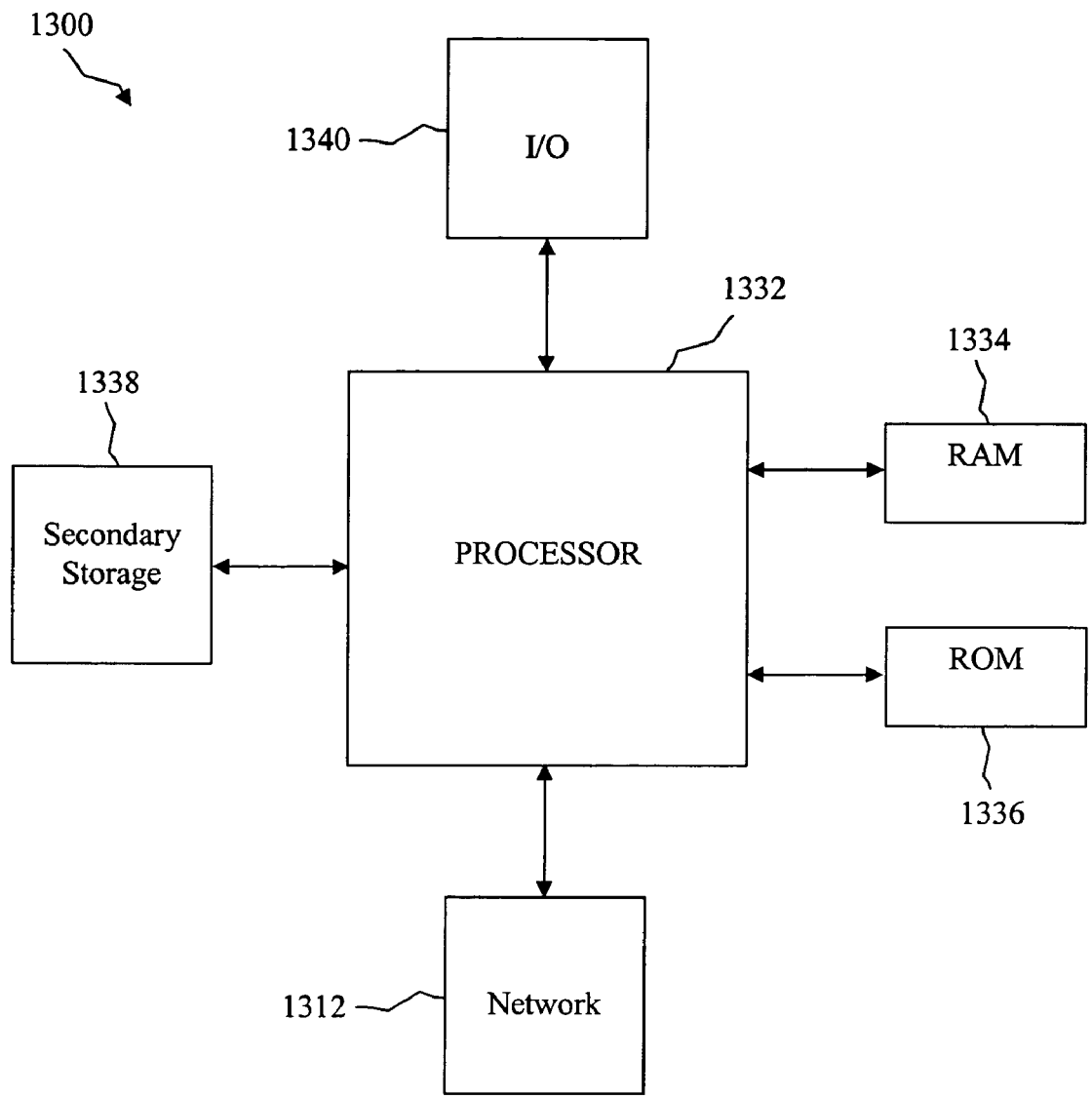
FIG. 3 is a block diagram of a computing system.

The system described above may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 1300 includes a processor 1332 (which may be referred to as a central processor unit or CPU) that is in communication with memory devices including secondary storage 1338, read only memory (ROM) 1336, random access memory (RAM) 1334, input/output (I/O) 1340 devices, and network connectivity devices 1312. The processor 1332 may be implemented as one or more CPU chips.

The secondary storage 1338 is typically comprised of one or more disk drives or tape drives and is used for non-volatile storage of data and as an over-flow data storage device if RAM 1334 is not large enough to hold all working data. Secondary storage 1338 may be used to store programs that are loaded into RAM 1334 when such programs are selected for execution. The ROM 1336 is used to store instructions and perhaps data that are read during program execution. ROM 1336 is a non-volatile memory device that typically has a small memory capacity relative to the larger memory capacity of secondary storage. The RAM 1334 is used to store volatile data and perhaps to store instructions. Access to both ROM 1336 and RAM 1334 is typically faster than to secondary storage 1338.

I/O 1340 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 1312 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as Global System for Mobile Communications (GSM) radio transceiver cards, and other well-known network devices. These network connectivity devices 1312 may enable the processor 1332 to communicate with the Internet or one or more intranets. With such a network connection, it is contemplated that the processor 1332 might receive information from the network, or might output information to the network in the course of performing the above-described method steps. Such information, which is often represented as a sequence of instructions to be executed using processor 1332, may be received from and outputted to the network, for example, in the form of a computer data signal embodied in a carrier wave.

Such information, which may include data or instructions to be executed using processor 1332 for example, may be received from and outputted to the network, for example, in the form of a computer data baseband signal or signal embodied in a carrier wave. The baseband signal or signal embodied in the carrier wave generated by the network connectivity devices 1312 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1332 executes instructions, codes, computer programs, scripts which it accesses from hard disk, floppy disk, optical disk (these various disk based systems may all be considered secondary storage 1338), ROM 1336, RAM 1334, or the network connectivity devices 1312.

While several embodiments have been provided in the present disclosure, it should be understood that the Mechanism for Layered Authentication may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A system for secure communication over a computer network comprising:
    a web server configured to receive a message from a customer application via a transport layer and further configured to validate a digital certificate associated with the message at the transport layer;
    a component configured to receive the digital certificate from the web server at the transport layer and to provide the digital certificate at an application layer; and
    a service gateway configured to receive the digital certificate at the application layer and to identify the customer application associated with the digital certificate, the service gateway also configured to promotes validation of the digital certificate, and when the digital certificate is valid, the service gateway is further configured to promote access by the customer application to a supplier application.

2. The system of claim 1 wherein the web server communicates at least partially with the customer application at the OSI transport layer, the service gateway communicating at least partially at the OSI application layer.

3. The system of claim 2 wherein the validation of the digital certificate by the web server occurs by two-way Secure Sockets Layer communication.

4. The system of claim 1 further comprising a web services security component in communication with the service gateway, the web services security component configured to validate the digital certificate and determine the identity of the customer application using the digital certificate.

5. The system of claim 4 further comprising a certificate revocation list accessible by the web services security component and accessible by the service gateway to determine whether the digital certificate has been revoked.

6. The system of claim 5 further comprising a certificate revocation list maintained by the web services security component and accessible by the service gateway to determine whether the digital certificate has been revoked.

7. The system of claim 1 wherein the digital certificate is further defined as an X.509 standard digital certificate.

8. The system of claim 1 wherein the component is a software component that receives the digital certificate from the web server and wherein the service gateway includes the software component.

9. The system of claim 1 wherein the service gateway receives the digital certificate at the application layer from the component.

10. A method for securely sending a message from a customer application to a supplier application, the method comprising:
    obtaining a digital certificate from a certificate authority by the customer application;
    configuring the digital certificate with identifying information by the customer application;
    sending a message and the digital certificate by the customer application to a web server;
    sending identifying information by the web server to the customer application;
    authenticating the customer application by the web server at the transport layer using the digital certificate;
    authenticating the web server by the customer application;
    communicating at the application layer between the web server and a service gateway related to the digital certificate;
    identifying the customer application by the service gateway; and
    checking a certificate revocation list to determine if the digital certificate has been revoked, and
    promoting access by the customer application to a supplier application if the digital certificate has not been revoked.

11. The method of claim 10 wherein the authenticating of the customer application and the web server occurs at the OSI transport layer.

12. The method of claim 11 wherein the authenticating of the customer application and the web server occurs via two-way Secure Sockets Layer communication.

13. The method of claim 12 wherein the obtaining of the digital certificate from the web server by the service gateway is performed by a software routine residing in the service gateway.

14. The method of claim 10 further comprising obtaining of the digital certificate from the web server by the service gateway.

15. The method of claim 14 wherein the checking of the certificate revocation list by the service gateway is accomplished by a web services security component maintaining the certificate revocation list.

16. The method of claim 14 wherein the digital certificate is moved from the OSI transport layer to the OSI application layer.

17. The method of claim 10 wherein the digital certificate complies with the X.509 standard for digital certificates.

* * * * *